(12) United States Patent
Souchkov

(10) Patent No.: US 8,274,491 B2
(45) Date of Patent: Sep. 25, 2012

(54) CAPACITIVE TOUCHSCREEN SIGNAL ACQUISITION WITHOUT PANEL RESET

(75) Inventor: Vitali Souchkov, Walnut Creek, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 148 days.

(21) Appl. No.: 12/957,489

(22) Filed: Dec. 1, 2010

(65) Prior Publication Data
US 2011/0310054 A1     Dec. 22, 2011

Related U.S. Application Data

(63) Continuation-in-part of application No. 12/819,635, filed on Jun. 21, 2010.

(51) Int. Cl.
*G06F 3/041* (2006.01)
(52) U.S. Cl. ....................................................... 345/173
(58) Field of Classification Search ............ 345/87–100, 345/156–174, 204–205, 207, 211–214; 324/658; 382/124; 200/19.06, 43.01, 43.06; 178/18.01
See application file for complete search history.

(56) References Cited

U.S. PATENT DOCUMENTS

| | | | |
|---|---|---|---|
| 7,075,316 B2 * | 7/2006 | Umeda et al. ................. | 324/658 |
| 7,307,626 B2 | 12/2007 | Martchovsky | |
| 7,683,640 B2 | 3/2010 | Chuang et al. | |
| 8,093,914 B2 * | 1/2012 | Maharyta et al. ............. | 324/684 |
| 8,125,465 B2 * | 2/2012 | Lin et al. ........................ | 345/174 |
| 2007/0285369 A1 * | 12/2007 | Park et al. ....................... | 345/90 |
| 2009/0115735 A1 | 5/2009 | Chuang | |
| 2009/0295754 A1 | 12/2009 | Chen | |
| 2009/0315858 A1 * | 12/2009 | Sato et al. ..................... | 345/174 |
| 2010/0060610 A1 | 3/2010 | Wu | |
| 2010/0079406 A1 | 4/2010 | Chen et al. | |
| 2010/0111137 A1 * | 5/2010 | Chen et al. .................... | 374/178 |
| 2011/0163768 A1 | 7/2011 | Kwon | |

FOREIGN PATENT DOCUMENTS

JP     2010-250522     11/2010

* cited by examiner

*Primary Examiner* — William Boddie
*Assistant Examiner* — Mansour M Said
(74) *Attorney, Agent, or Firm* — Winston Hsu; Scott Margo

(57) ABSTRACT

Various embodiments of readout circuits are disclosed where no touchscreen or touch panel recharge is required, and the amount of time available for signal acquisition is twice that relative to prior art touchscreen or touch panel readout circuits. Voltage offsets of the integrating amplifiers may be compensated for by notch filtering signals stored in readout circuit capacitors. Some embodiments of readout circuits disclosed herein permit large dynamic range capacitive touchscreen or touch panel signals to be processed, and do not require panel reset. Readout circuits are disclosed that permit doubling of the signal acquisition rate and pre-filtering of acquired touch panel signals for improved immunity from harmonic EMI. Signal acquisition and temporary storage may be carried out using the same capacitors in such readout circuits.

23 Claims, 9 Drawing Sheets

CAPACITIVE TOUCHSCREEN SIGNAL ACQUISITION WITHOUT PANEL RESET

RELATED APPLICATION

This application claims priority and other benefits from, and is a continuation-in-part of, U.S. patent application Ser. No. 12/819,635 filed Jun. 21, 2010 entitled "Capacitive Touchscreen System with Switchable Charge Acquisition Circuit" to Souchkov, which is also hereby incorporated by reference herein, in its entirety.

FIELD OF THE INVENTION

Various embodiments of the invention described herein relate to the field of capacitive sensing input devices generally, and more specifically to charge acquisition circuits for capacitive touchscreens and touch panels.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger grounded through the human body, where the body is essentially a capacitor to a surface where the electric field vanishes, and typically has a capacitance of around 100 pF.

Electrodes in self-capacitance touchpads are typically arranged in rows and columns. By scanning first rows and then columns the locations of individual mutual capacitance changes induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE™. In mutual capacitance measurement, capacitance is measured between two conductors, as opposed to a self-capacitance measurement in which the capacitance of a single conductor is measured, and which may be affected by other objects in proximity thereto.

Simultaneously driving of all drive electrodes or lines on a touchscreen can increase the dynamic range signals appearing on the sense electrodes or lines, and presented to the corresponding sense circuitry, according to the number of drive electrodes driven at one time. Handling the resulting increased dynamic range of charge signals presented to the sense circuitry can be accomplished by using conventional charge integrator readout circuits having increased feedback capacitor values. As alluded to above, such feedback capacitor values are increased according to the number of simultaneously driven drive electrodes, which in a large touchscreen may require an increase of feedback capacitance by a factor of 20 or more. If high drive voltages are used to increase touch signal noise immunity in a touchscreen, feedback capacitor values in charge integrator circuits incorporated into the sensing circuitry must also typically be increased. Large feedback capacitor values present certain well-known problems when actually implemented in a touchscreen system, however, such as an increased amount of area being required in an integrated circuit implementation. While active current division circuits preceding charge integrator circuits may be employed to reduce feedback capacitor size, doing so requires the use of additional amplifiers and resistors, which are less operationally and temperature stable components compared to integrated capacitors.

What is needed is a capacitive measurement or sensing circuit or system that may be employed in touchscreen and touchpad applications that does not require the use of large feedback capacitors or the use of active current division circuits, and that does not require panel reset for each cycle of capacitance sensing measurements.

SUMMARY

In one embodiment, there is a provided a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes, one or more drive circuits operably connected to the first plurality of drive electrodes, and a plurality of sense circuits, each of the plurality of sense circuits being operably connected to a corresponding one of the second plurality of sense electrodes, each sense circuit comprising a gain capacitor having first and second terminals, a first switch, a second switch, a third switch, and an operational amplifier having positive and negative input terminals and an output terminal, the first terminal of the gain capacitor being connected to the corresponding sense electrode, the second terminal of the gain capacitor being operably connected to the first and second switches, the positive input terminal being connected to ground, the first switch being located between the second terminal of the gain capacitor and ground, the second switch being located between the second terminals of the gain capacitor and the negative input terminal of the operational amplifier, the third switch being located in a feedback loop of the operational amplifier between the negative input and output terminals thereof, the feedback capacitor being arranged in parallel with respect to the third switch in the feedback loop, wherein during a first stage the gain capacitor accumulates a charge representative of mutual capacitances and stray capacitances in the sense electrode corresponding thereto when the first switch is closed, the second switch is open, the third switch is closed, and a drive signal provided to at least one of the drive electrodes is high, and the charge accumulated in the gain capacitor during the first stage is transferred to the feedback capacitor during a second stage when the first switch is open, the second switch is closed, the third switch is open, and the drive signal is low.

In another embodiment, there is provided a capacitive touchscreen system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes, one or more drive circuits operably connected to the first plurality of drive electrodes, and a plurality of sense circuits, each of the plurality of sense circuits being operably connected to a corresponding one of the second plurality of sense electrodes, each sense circuit comprising a gain capacitor having first and second terminals, first, second, third, fourth, fifth and sixth switches, an operational amplifier having positive and negative input terminals and an output terminal, and first and second feedback capacitors, the first terminal of the gain capacitor being connected to the corresponding sense electrode, the second terminal of the gain capacitor being operably connected to the first switch, the positive input terminal being connected to ground, the first switch being located between the gain capacitor and the negative input terminal of the operational amplifier, the second switch being located in a feedback loop of the operational amplifier between the negative input and output terminals thereof, the first feedback capacitor having a first terminal connected to the negative input of the amplifier and a first terminal of the second feedback capacitor, the sixth switch being connected between a second terminal of the second feedback capacitor and the output of the operational amplifier, a second terminal of the first feedback capacitor being connected to the third and fourth switches, the third switch being located between the second terminal of the first feedback capacitor and ground, the fourth switch being located between the second terminal of the first feedback capacitor and the output terminal of the operational amplifier, the fifth switch being located between the second terminal of the second feedback capacitor and ground, wherein during a first stage the gain capacitor accumulates a charge representative of mutual capacitances and stray capacitances in the sense electrode corresponding thereto when the first, second and third switches are closed, the fourth, fifth and sixth switches are open, and a drive signal provided to at least one of the drive electrodes is high, and the charge accumulated in the gain capacitor during the first stage is transferred to the first feedback capacitor during a second stage when the second, third, fifth and sixth switches are open, the first and fourth switches are closed, and the drive signal is low, the first switch being open momentarily between the first and second stages, during a third stage the gain capacitor accumulates a charge representative of mutual capacitances and stray capacitances in the sense electrode corresponding thereto when the first, second and fifth switches are closed, the third, fourth and sixth switches are open, and a drive signal provided to at least one of the drive electrodes is high, and the charge accumulated in the gain capacitor during the third stage is transferred to the second feedback capacitor during a fourth stage when the second, third, fourth and fifth switches are open, the first and sixth switches are closed, and the drive signal is low, the first switch being open momentarily between the third and fourth stages.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
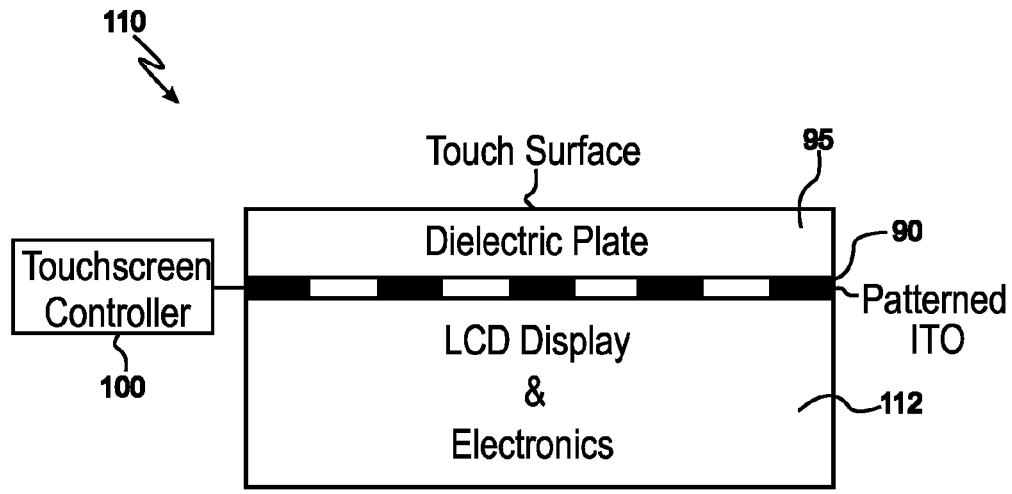
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
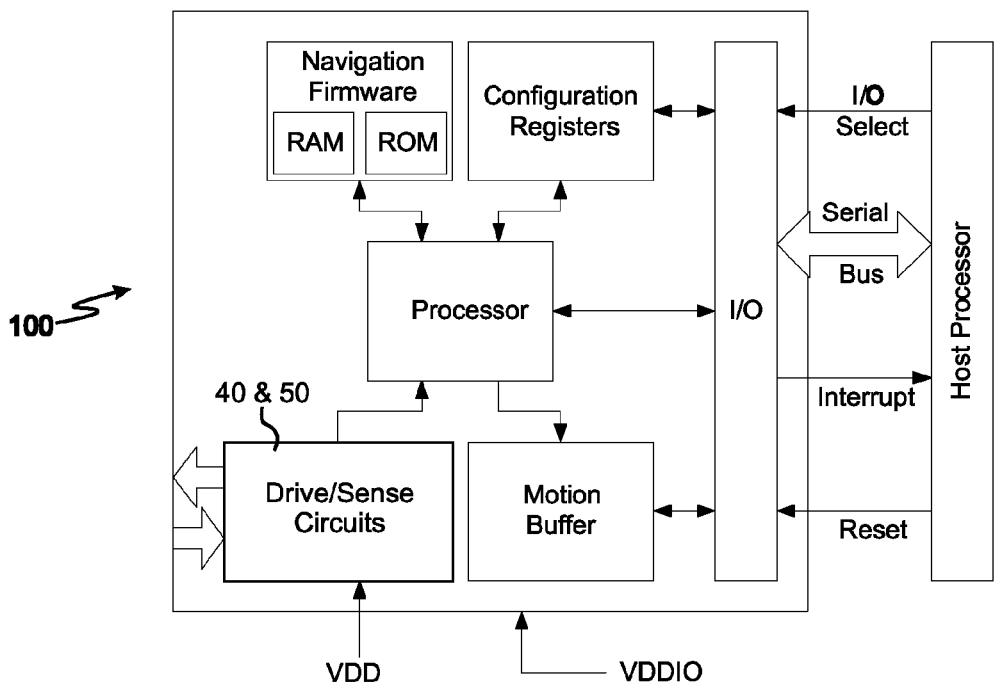
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
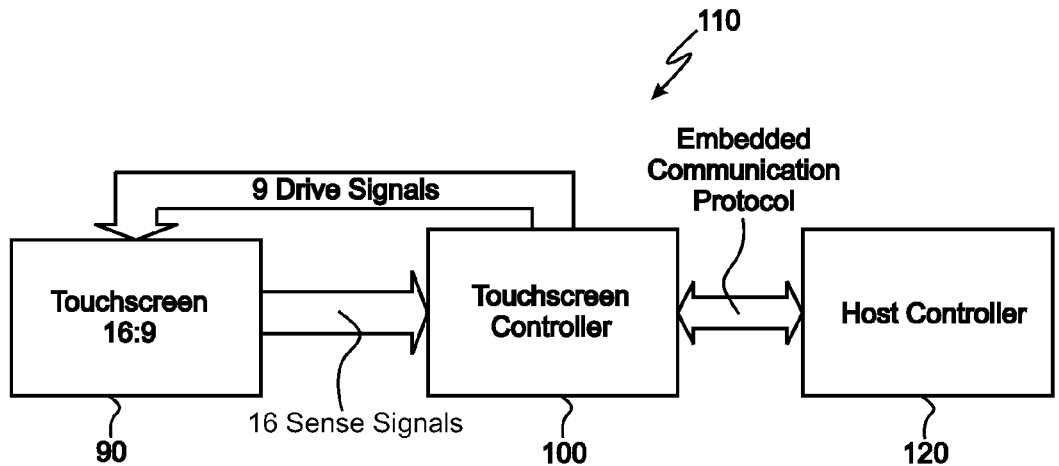
FIG. 3 shows one embodiment of a block diagram of a capacitive touchscreen system and a host controller.
Figure 4:
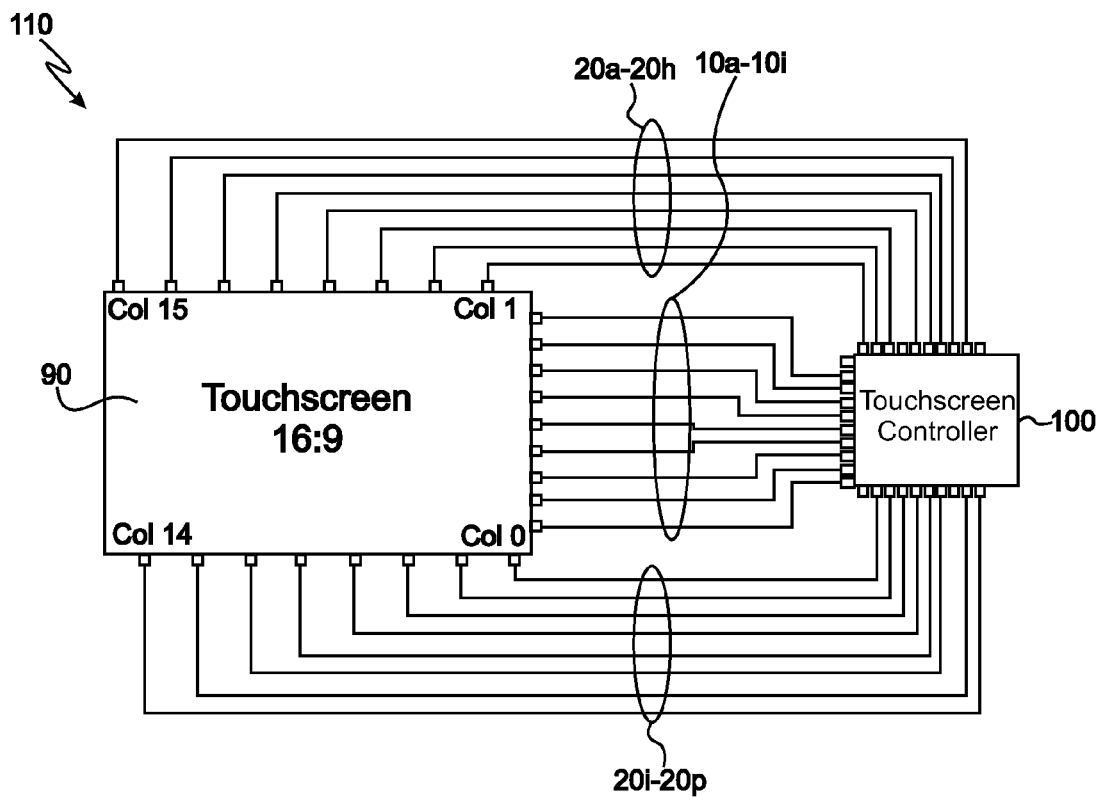
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 drive signal lines and 16 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 features multiple operating modes with varying levels of power consumption. In rest mode controller 100 periodically looks for touches at a rate programmed by the rest rare registers. There are multiple rest modes, each with successively lower power consumption. In the absence of a touch for a certain interval controller 100 automatically shifts to the next-lowest power consumption mode. However, as power consumption is reduced the response time to touches increases.

According to one embodiment, and as shown in FIG. 4, an ITO grid or other electrode configuration on touchscreen 90 comprises sense columns 20a-20p and drive rows 10a-10i, where sense columns 20a-20p are operably connected to corresponding sense circuits and rows 10a-10i are operably connected to corresponding drive circuits. One configuration for routing ITO or other drive and sense electrodes to lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

The various embodiments of readout circuits disclosed herein are capable of acquiring large dynamic range signals from capacitive touchscreen or touch panel 90 in the presence of strong harmonic Electromagnetic Interference (EMI) by using the highest possible acquisition rates. Such readout circuits occupy small areas in integrated circuit implementations and dissipate low amounts of power. As discussed above, capacitive touchscreen or touch panel 90 for mutual capacitance sensing typically comprises two sets of electrodes disposed along orthogonal (or non orthogonal) axes, where the electrical capacitance of overlapping regions of electrodes (namely mutual or pixel capacitance) is changed by a presence of an object such as a finger, hand or stylus positioned close to the region where electrodes overlap. As discussed above, a capacitive sensing network comprises overlapping electrode regions or pixels to form touchscreen or touch panel 90.

A wide or high dynamic range of readout signals is desirable if different types of touchscreens or touch panels 90 are to be used successfully with a single type of touch screen controller 100. In some touchscreens or touch panels 90, pixel capacitors with high values may be mixed with pixel capacitors having small values. Multiple drive lines may be driven simultaneously, or elevated drive signal voltage swings may be used to obtain higher capacitive touch panel readout noise immunity. Large area capacitors used in the charge integrators of conventional capacitive sensor integrated readout circuits are cumbersome to implement in touch screen controller 100. It may also be required that many channels in controller 100 operate simultaneously. Active or passive touch panel current division preceding charge integrators may also be used to increase signal dynamic range. Such solutions typically require the use of additional amplifiers or resistors, which are less temperature- and functionally-stable than integrated capacitors.

The Correlated Double Sampling (CDS) readout circuits for capacitive touchscreens and touch panels 90 disclosed herein allow processing of large dynamic range capacitive touch panel signals and do not require that touchscreen or touch panel 90 be reset after each sensing cycle. The disclosed readout circuits permit doubling of the signal acquisition rate with pre-filtering of the acquired touch panel signals for better harmonic EMI immunity. Moreover, signal acquisition and temporary storage may be carried out using same the capacitors.

Figure 5:
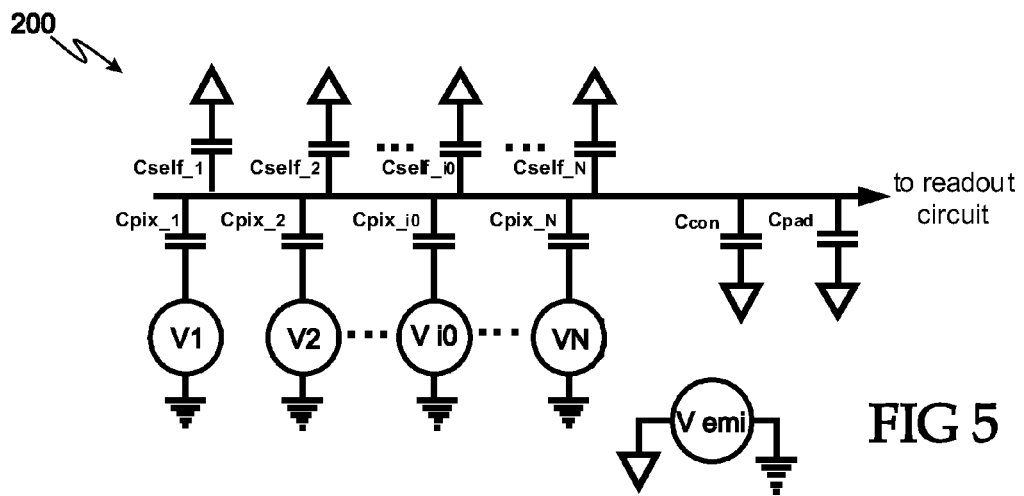
FIG. 5 shows one embodiment of a single sense line 200 operably connected to a charge acquisition circuit and a corresponding charge integrator or readout circuit.

FIG. 5 shows one embodiment of a sense line in a capacitive touchscreen or touch panel 90. Each overlap region for the drive and sense electrodes is denoted by pixel (Cpix_i) and self capacitance (Cself_i) capacitors. Often in touch panel operation, only one line is driven at a time, so that, by way of example, if line is driven, then voltage source Vi0 follows the drive signal, while Vi=0 for any i that is not equal to i0 (i.e., other drive lines are connected to system ground). In addition, an EMI source is connected between the system ground shown in the bottom right of FIG. 5 and the electric field ground, which corresponds to zero electric field potential at infinity (denoted by the empty triangle symbol of FIG. 5). The capacitive network shown in FIG. 5 is connected to one readout circuit. One readout circuit per sense line is used to read signals from capacitive touchscreen or touch panel 90. Touchscreen connector and integrated circuit pad capacitors Ccon and Cpad are parts of the capacitive network corresponding to the sense line shown in FIG. 5.

Figure 6:
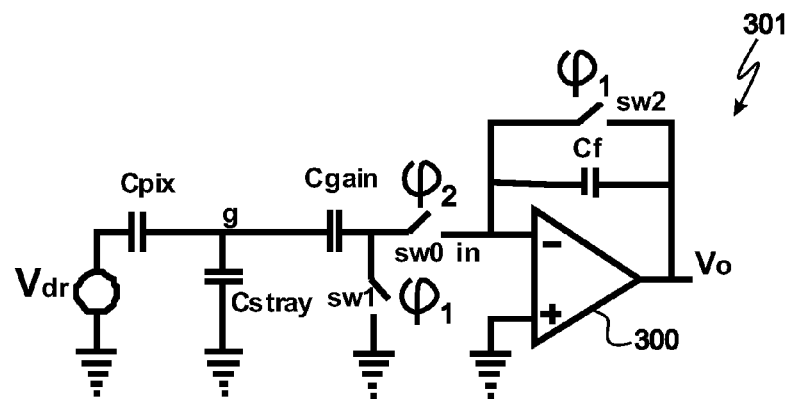
FIG. 6 shows one embodiment of readout circuit 301.
Figure 7:
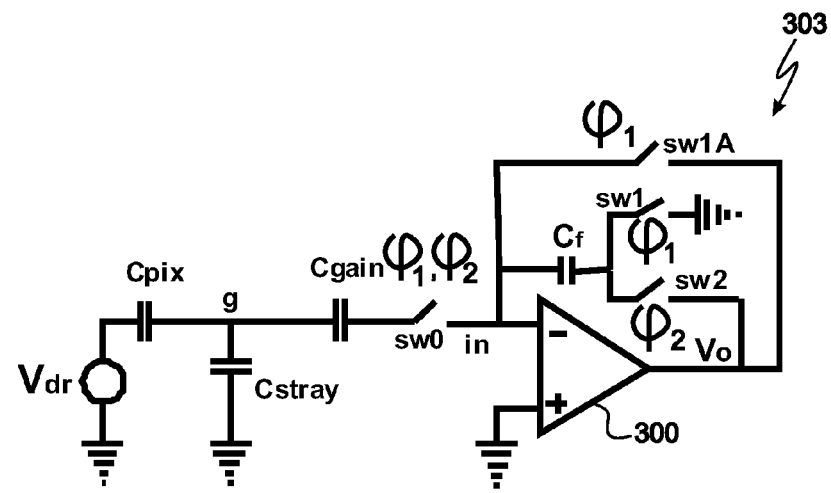
FIG. 7 shows another embodiment of readout circuit 303.
Figure 8:
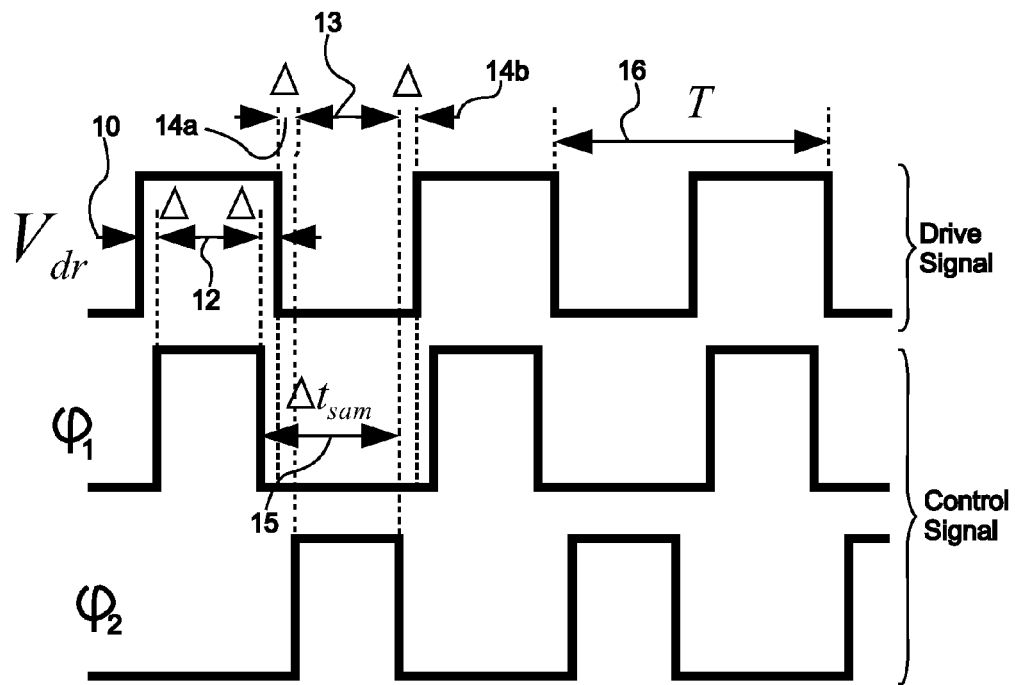
FIG. 8 shows various simulated signals corresponding to the circuits of FIGS. 6, 7 and 9.

FIG. 5 shows a single sense line circuit 200. Pixel charges are acquired from sense line 200 by readout circuits 301 and 303 of FIGS. 6 and 7. FIGS. 6 and 7 show simplified models of the capacitive network of FIG. 5, where a driven pixel capacitor is disentangled from the rest of the capacitive network represented by capacitor Cstray (which includes all mutual and self capacitances, as well as connector and pad capacitances). A timing diagram for the signals controlling operation of the circuits of FIGS. 6 and 7 is shown in FIG. 8. Signal acquisition is divided into two phases controlled by the logical states of the control signals designated $\phi_1$ and $\phi_2$. Switches in FIGS. 6 and 7 are assumed to be closed when corresponding control signals $\phi_1$ or $\phi_2$ are in a logical high state.

Referring now to FIG. 6, the operation of readout circuit 301 is described as follows. Switches 'sw1' and 'sw2' in FIG. 6 are closed when control signal $\phi_1$ is at logical high state. The transition of $\phi_1$ from a low to high state is delayed by time interval $\Delta$ as compared to the transition of drive signal Vdr from a low to high level. Capacitor Cgain, which is a part of readout circuit 310, is charged while Vdr is at high level, and at the same time that capacitor Cf is shorted or reset. Switches 'sw' and 'sw2' are opened when control signal $\phi_1$ goes to a low state. This occurs prior to the drive signal going to a low level by $\Delta$ time interval, as shown in FIG. 8. When drive signal is at a low level, switch 'sw0' is closed by $\phi_2$ driven to a logical high state, which allows charging of feedback capacitor Cf of the integrator by the charge collected in capacitor Cgain. Closing of switch 'sw0' is delayed by a predefined time interval with respect to the moment at which switches 'sw1' and 'sw2' are opened. Such a time interval may have a duration of $2\Delta$, as shown in FIG. 8. In general, time intervals $\Delta$ of FIG. 8 separate different signal transition edges, and may or may not be equal. At the end of charge redistribution, the sense line signal transferred to the integrator output represents the difference between successively-sampled signals correlated in time, which is then made available for further processing; redistribution time is limited mainly by the touchscreen or touch panel charge redistribution time and integrator inverse bandwidth.

Referring to FIGS. 6 and 8, the operation of one embodiment of readout circuit 301 of FIG. 6 is further described for a capacitive touchscreen system comprising touchscreen 90, which includes a first plurality of electrically conductive drive electrodes arranged in rows or columns (e.g., drive electrodes 10a-10i in FIGS. 3 and 4), and a second plurality of electrically conductive sense electrodes arranged in rows or columns arranged at an angle with respect to the rows or columns of the first plurality of electrodes (e.g., sense electrodes 20a-20p in FIGS. 3 and 4), where mutual capacitances exist between the first and second pluralities of electrodes at locations where the first and second pluralities of electrodes intersect. Such mutual capacitances change in the presence of one or more fingers or touch devices brought into proximity thereto, and stray capacitances are associated with each of the second plurality of electrodes. Referring now to FIGS. 3, 4, 6 and 8, one or more drive circuits are operably connected to the first plurality of drive electrodes, and a plurality of sense circuits are operably connected to corresponding ones of the second plurality of sense electrodes.

As shown in FIG. 6, each sense circuit 301 comprises a gain capacitor having first and second terminals (Cgain), a first switch (sw1), a second switch (sw0), a third switch (sw2), and an operational amplifier (300) having positive and negative input terminals and an output terminal. The first terminal of the gain capacitor Cgain is connected to its corresponding sense electrode, and the second terminal of the gain capacitor Cgain is operably connected to the first switch (sw1) and the second switch (sw0). The positive input terminal of operational amplifier 300 is connected to ground. The first switch (sw1) is located between the second terminal of the gain capacitor Cgain and ground, and the second switch (sw0) is located between the second terminal of the gain capacitor Cgain and the negative input terminal of operational amplifier 300. The third switch (sw2) is located in a feedback loop of operational amplifier 300 between the negative input and output terminals thereof. A feedback capacitor Cf is arranged in parallel with respect to the third switch (sw2) in the feedback loop.

Continuing to refer to FIGS. 6 and 8, during a first stage corresponding to $\phi_1$, gain capacitor Cgain accumulates a charge representative of mutual capacitances and stray capacitances in the sense electrode corresponding thereto when the first switch (sw1) is closed, the second switch (sw0) is open, the third switch (sw2) is closed, and drive signal Vdr provided to at least one of the drive electrodes is high. The charge accumulated in the gain capacitor Cgain during the first stage corresponding to $\phi_1$ is transferred to the feedback capacitor Cf during a second stage corresponding to $\phi_2$ when the first switch (sw1) is open, the second switch (sw0) is closed, the third switch (sw2) is open, and the drive signal is low.

Note that in one embodiment, operational amplifier 300 may be a transconductance amplifier. Operation of the first, second and third switches sw1, sw0 and sw2 may be controlled by a processor operably connected to sense or readout circuit 301. As shown in FIG. 8, such a processor may be configured to provide first digital control signals $\phi_1$ to the first and third switches sw1 and sw2 that are in a logical high state over at least portions of time when the drive signal Vdr is high and that are in a logical low state when the drive signal is low. The processor may further be configured to provide first digital control signals $\phi_1$ to the first and third switches sw1 and sw2 that are in logical low state near leading and trailing edges of each high drive signal (see FIG. 8). In addition, the processor may be configured to provide a second digital control signal $\phi_2$ to the second switch (sw0) that is in a logical high state over at least portions of time when the drive signal is low and that is in a logical low state when the drive signal Vdr is high. The processor may further be configured to provide a second digital control signal $\phi_2$ to the second switch sw2 that is in a logical high state after trailing edges of one high drive signal and before leading edges of a following high drive signal (see FIG. 8).

Another embodiment illustrating the above-described acquisition principle may be implemented using circuit 303 of FIG. 7. The control signal protocol of FIG. 8 may be the same for circuits 301 and 303 shown in FIGS. 6 and 7, where control signals $\phi_1$ and $\phi_2$ are applied to switch 'sw0' one at a time for circuit 303 of FIG. 7. The main difference between circuit 303 of FIG. 7 and circuit 310 of FIG. 6 has to do with charging capacitor Cgain, where a voltage at the "in" node of the integrator is used in circuit 303 of FIG. 7 instead of employing a system ground potential as in the acquisition phase controlled by $\phi_1$ in circuit 301 of FIG. 6. Circuit 303 of FIG. 7 allows compensation for the internal voltage offset of operational amplifier 300 of the integrator circuit.

Figure 9:
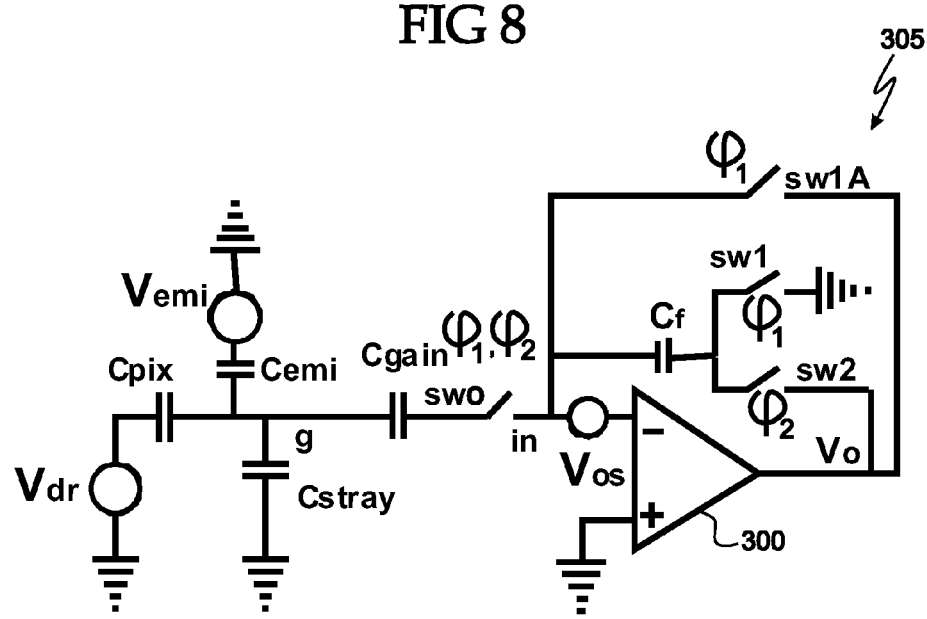
FIG. 9 shows yet another embodiment of readout circuit 305.

FIG. 9 shows circuit 303 of FIG. 7 with additional elements, where the contributions of harmonic EMI and amplifier voltage offsets are provided to the output of readout circuit 305. The largest contribution to EMI comes from the area of touchscreen 90 where EMI induced in a human body by external electric fields or voltage variations of system ground to electric field ground charge the sense line through a human finger. Assuming all possible EMI sources, one Vemi voltage source driving a Cemi capacitor is connected to the sense line, as shown in FIG. 9 and in accordance with the detailed EMI analysis set forth below.

Referring now to FIGS. 8 and 9, the operation of readout circuit 305 of FIG. 9 is described for a capacitive touchscreen system comprising touchscreen 90, which includes a first plurality of electrically conductive drive electrodes arranged in rows or columns (e.g. drive electrodes 10a-10i in FIGS. 3 and 4), and a second plurality of electrically conductive sense electrodes arranged in rows or columns arranged at an angle with respect to the rows or columns of the first plurality of electrodes (e.g., sense electrodes 20a-20p in FIGS. 3 and 4), where mutual capacitances exist between the first and second pluralities of electrodes at locations where the first and second pluralities of electrodes intersect. Such mutual capacitances change in the presence of one or more fingers or touch devices brought into proximity thereto, and stray capacitances are associated with each of the second plurality of electrodes. Referring to FIGS. 3, 4, 8 and 9, one or more drive circuits are operably connected to the first plurality of drive electrodes, and a plurality of sense circuits are operably connected to corresponding ones of the second plurality of sense electrodes.

As shown in FIG. 9, each sense circuit 305 comprises a gain capacitor Cgain having first and second terminals, a first switch (sw0), a second switch (sw1A), a third switch (sw1), a fourth switch (sw2), and an operational amplifier 300 having positive and negative input terminals and an output terminal. The first terminal of gain capacitor Cgain is connected to its corresponding sense electrode. The second terminal of gain capacitor Cgain is operably connected to the first switch (sw0), the positive input terminal of operational amplifier 300 is connected to ground. The first switch (sw0) is located between gain capacitor Cgain and the negative input terminal of the operational amplifier 300. The second switch (sw1A) is located in a first feedback loop of operational amplifier 300 between the negative input and output terminals thereof. Feedback capacitor Cf has a first terminal connected to the negative input of operational amplifier 300 and a first terminal of the second switch (sw1A). A second terminal of feedback capacitor Cf is connected to the third switch (sw1) and the fourth switch (sw2). The third switch (sw1) is located between the second terminal of the feedback capacitor Cf and ground, and the fourth switch (sw2) is located between the second terminal of the feedback capacitor Cf and the output terminal of operational amplifier 300.

Continuing to refer to FIGS. 8 and 9, during a first stage corresponding to φ1, capacitor Cgain accumulates a charge representative of mutual capacitances and stray capacitances in the sense electrode corresponding thereto when the first, second and third switches sw0, sw1A and sw1 are closed, the fourth switch sw2 is open, and drive signal Vdr provided to at least one of the drive electrodes is high. The charge accumulated in gain capacitor Cgain during the first stage corresponding to φ1 is transferred to feedback capacitor Cf during a second stage corresponding to φ2 when the second and third switches sw1A and sw1 are open, the first and fourth switches sw0 and sw2 are closed, and drive signal Vdr is low. Note that first switch sw0 is open momentarily between the first and second stages corresponding to φ1 and φ2; see small time intervals 14a and 14b in FIG. 8.

Note that in one embodiment, operational amplifier 300 may be a transconductance amplifier. Referring to FIGS. 8 and 9, operation of the first, second, third, and fourth switches sw0, sw1A, sw1 and sw2 may be controlled by a processor operably connected to the sense circuit. Such a processor may be configured to provide first digital control signals φ1 to the first, second and third switches sw0, sw1A and sw1 that are in a high logical state over at least portions of time when drive signal Vdr is high and that are in a low logical state when drive signal Vdr is low. The processor may further be configured to provide first digital control signals φ1 to the first, second and third switches sw0, sw1A and sw1 that are in a low logical state near leading and trailing edges of each high drive signal Vdr. The processor may also be configured to provide a second digital control signal φ2 to the fourth switch sw2 that is in a high logical state over at least portions of time when drive signal Vdr is low, and that is in a low logical state when drive signal Vdr is high. The processor may still further be configured to provide a second digital control signal φ2 to the fourth switch sw2 that is in a high logical state after trailing edges of one high drive signal Vdr and before leading edges of a following high drive signal Vdr.

Electric charges collected at individual capacitors of the network shown in FIG. 9 during acquisition phases φ1 or φ2 may be expressed in equations (1) through (4) as follows:

$$q_{pix} = (V_{g\phi_1,\phi_2} - V_{dr\phi_1,\phi_2})C_{pix} \tag{1}$$

$$q_{stray} = (V_{g\phi_1,\phi_2} - 0)C_{stray} \tag{2}$$

$$q_{emi} = (V_{g\phi_1,\phi_2} - V_{emi\phi_1,\phi_2})C_{emi} \tag{3}$$

$$q_{gain} = (V_{g\phi_1,\phi_2} - V_{os})C_{gain} \tag{4}$$

where Vg is the voltage at node 'g' in FIG. 9, indexes φ1, φ2 correspond to the two acquisition phases, and Vos is the offset voltage of the amplifier used in the integrator. Charge conservation requires that the total charge at node 'g' be zero during any phase since no sources are connected to node 'g', which may be described by equation (5) as follows:

$$q_{gain} + q_{emi} + q_{stray} + q_{pix} = 0 \tag{5}$$

During any phase the voltage at node 'g' may be expressed by equation (6) as follows:

$$V_{g\varphi_1,\varphi_2} = \frac{C_{emi}V_{emi\varphi_1,\varphi_2} + C_{pix}V_{dr\varphi_1,\varphi_2} + C_{gain}V_{os}}{C_{stray} + C_{emi} + C_{gain} + C_{pix}} \tag{6}$$

Similarly, because electric charge is conserved at node 'in' during the transition from phase φ1 to phase φ2 (after φ1 goes to a logical low state), the following expression may be obtained:

$$(V_{os} - V_{g\phi_1})C_{gain} + V_{os}C_f = (V_{os} - V_{g\phi_2})C_{gain} + (V_{os} - V_{o2})C_f \tag{7}$$

where Vo2 is the integrator output voltage at the end of phase φ2, where an ideal operational amplifier having an offset voltage Vos is assumed. From the foregoing the output voltage of the integrator at the end of phase φ2 may be expressed as follows:

$$V_{o2} = -\frac{C_{gain}}{C_f} \frac{C_{emi}(V_{emi\varphi_2} - V_{emi\varphi_1}) + C_{pix}(V_{dr\varphi_2} - V_{dr\varphi_1})}{C_{stray} + C_{emi} + C_{gain} + C_{pix}} \tag{8}$$

The output signal of a readout circuit of the type shown in FIG. 9 for a touch panel 90 having N drive lines with only a single i0 drive line being driven may be expressed as follows:

$$V_{o2} = -\frac{C_{gain}}{C_f} \frac{C_{emi}(V_{emi\varphi_2} - V_{emi\varphi_1}) + C_{pix\_i0}(V_{dr\varphi_2} - V_{dr\varphi_1})}{\sum_{i=1}^{N}(C_{pix\_i} + C_{self\_i}) + C_{emi} + C_{gain} + C_{con} + C_{pad}} \quad (9)$$

Figure 10:
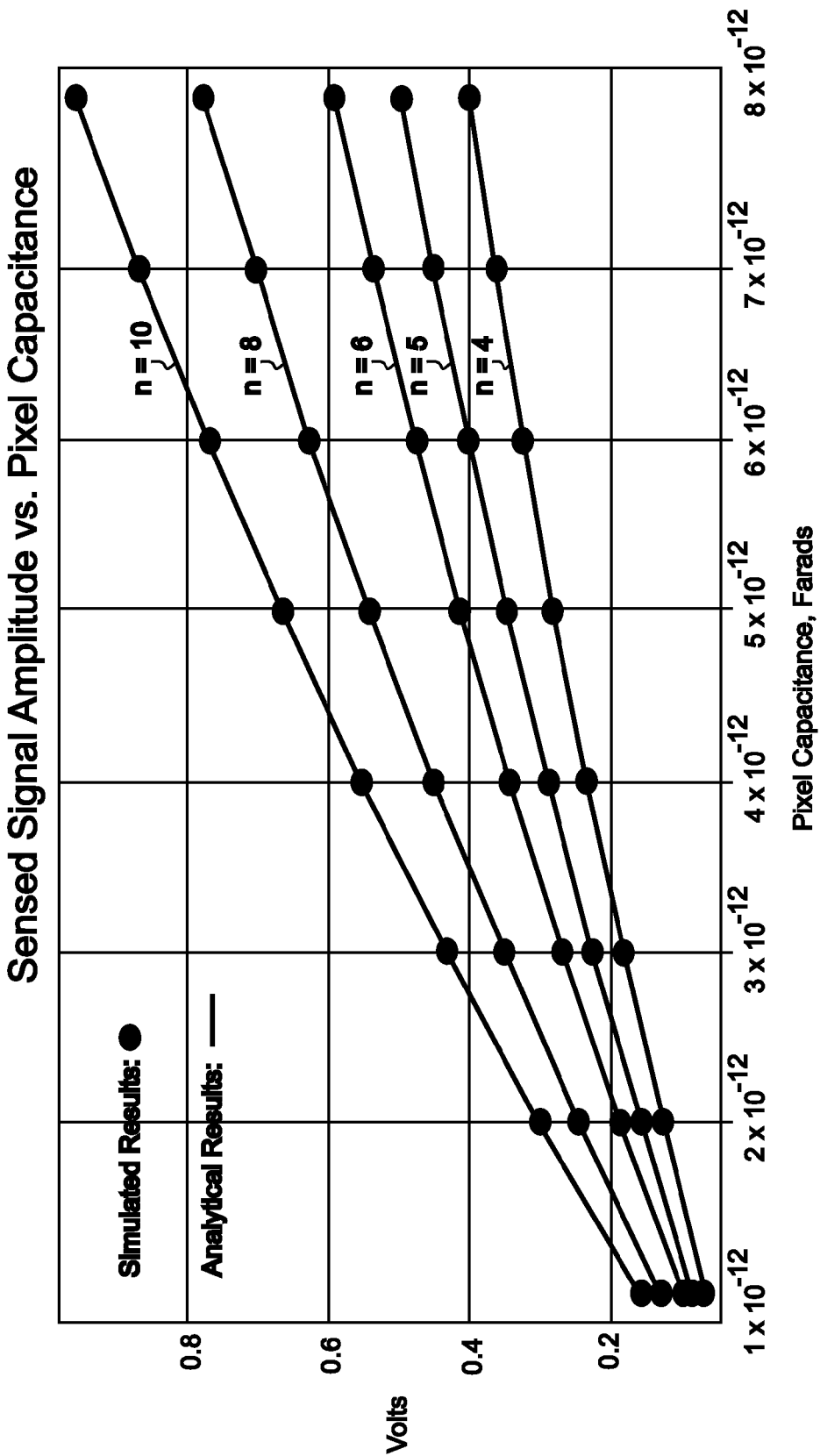
FIG. 10 shows analytical and simulated readout capacitance responses provided by readout circuit 305 of FIG. 9.

The signal conversion described in equation (8) above was verified with Spectre™ circuit simulation software having the following circuit parameters: Cf=1 pF, Cgain=n*0.2 pF, Vdrϕ1=1.8V, Vdrϕ2=0V, Cstray=20 pF, Cemi=0, Vemi=0. The results of simulations for gain settings n=4, 5, 6, 8 and 10 are plotted in FIG. 10, where the dependence of output voltage Vout versus pixel capacitor value Cpix is shown for gains having progressively higher values of n (see FIG. 10). FIG. 10 shows that the Spectre™ simulations (solid circles of FIG. 10) closely match those corresponding to analytic calculations (line plots of FIG. 10).

Figure 11:
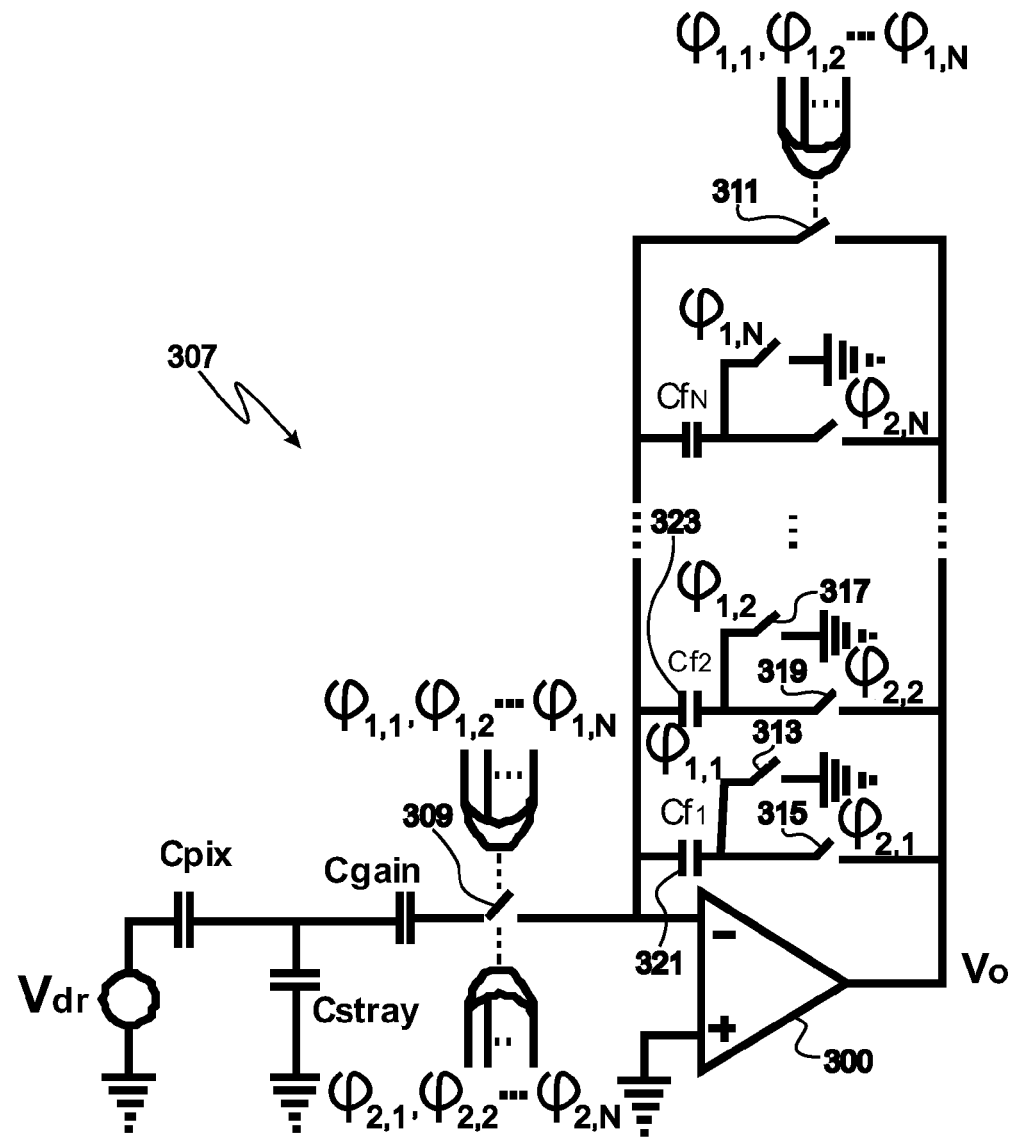
FIG. 11 shows still another embodiment of readout circuit 307.

To increase circuit immunity to EMI, several feedback capacitors may be used to acquire signals over a series of K samples using circuit 307 shown in FIG. 11. The circuit of FIG. 11 uses the control signal protocol shown in FIG. 12. Capacitors charged in acquisition cycles with a repetition period of T are read when capacitors Cf1, Cf2, ..., CEN are connected to the output of amplifier 300 by closing all switches controlled by ϕ$_{2,1}$, ϕ$_{2,2}$, ..., ϕ$_{2,N}$, which are all simultaneously driven to a logical high state.

Figure 12:
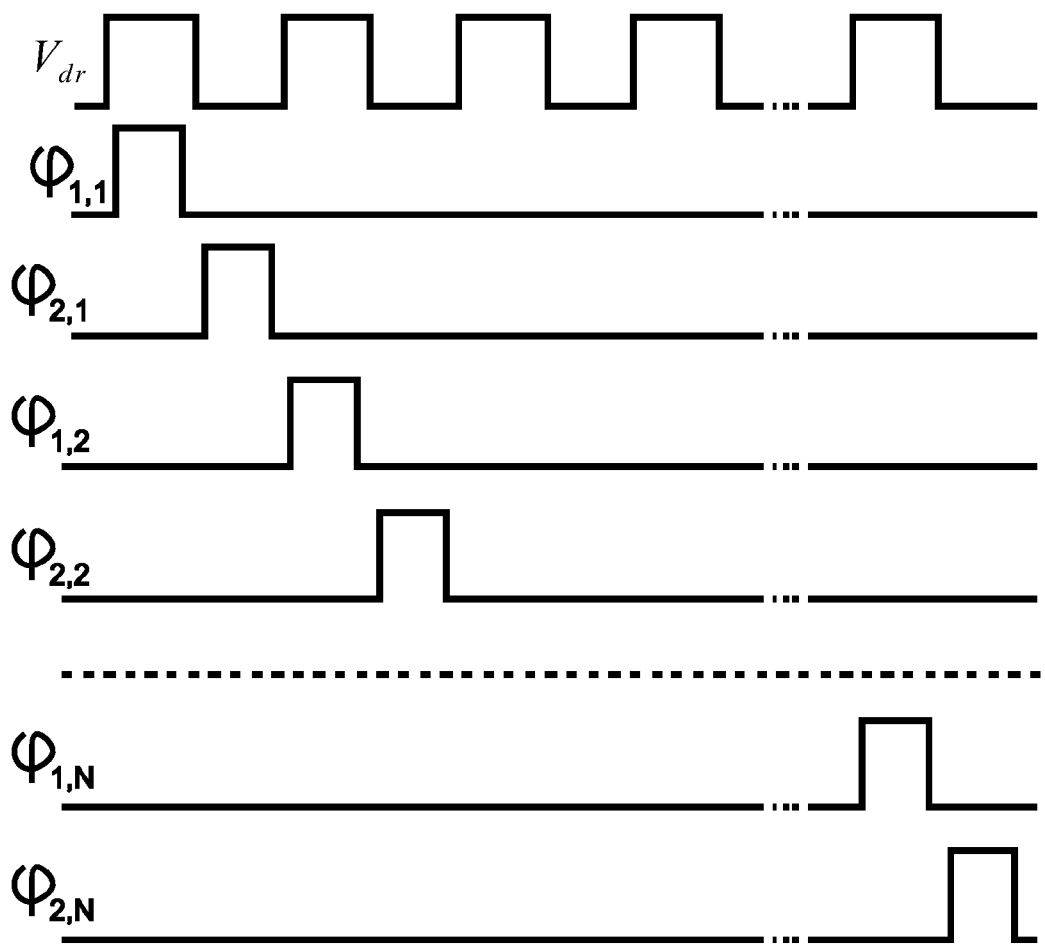
FIG. 12 shows various control signals corresponding to the circuit of FIG. 11.

Continuing to refer to FIGS. 11 and 12, the operation of readout circuit 307 of FIG. 11 is described for a capacitive touchscreen system comprising touchscreen 90, which includes a first plurality of electrically conductive drive electrodes arranged in rows or columns (e.g. drive electrodes 10a-10i in FIGS. 3 and 4), and a second plurality of electrically conductive sense electrodes arranged in rows or columns arranged at an angle with respect to the rows or columns of the first plurality of electrodes (e.g., sense electrodes 20a-20p in FIGS. 3 and 4), where mutual capacitances exist between the first and second pluralities of electrodes at locations where the first and second pluralities of electrodes intersect, and stray capacitances are associated with each of the second plurality of electrodes. Such mutual capacitances change in the presence of one or more fingers or touch devices brought into proximity thereto. Referring to FIGS. 3, 4, 11 and 12, one or more drive circuits are operably connected to the first plurality of drive electrodes, and a plurality of sense circuits are operably connected to corresponding ones of the second plurality of sense electrodes.

As shown in FIG. 11, each sense circuit 307 is operably connected to a corresponding one of the second plurality of sense electrodes. Each sense circuit 307 comprises a gain capacitor Cgain having first and second terminals, first, second, third, fourth, fifth and sixth switches (309, 311, 313, 315, 317, and 319, respectively), operational amplifier 300 having positive and negative input terminals and an output terminal, and first and second feedback capacitors 321 and 323. The first terminal of gain capacitor Cgain is connected to the corresponding sense electrode, and the second terminal of gain capacitor Cgain is operably connected to first switch 309. The positive input terminal of operational amplifier 300 is connected to ground. First switch 309 is located between gain capacitor Cgain and the negative input terminal of operational amplifier 300. Second switch 311 is located in a feedback loop of operational amplifier 300 between the negative input and output terminals thereof. First feedback capacitor 321 has a first terminal connected to the negative input of operational amplifier 300 and a first terminal of second feedback capacitor 323. Sixth switch 319 is connected between a second terminal of second feedback capacitor 323 and the output of operational amplifier 300. A second terminal of first feedback capacitor 321 is connected to the third and fourth switches 313 and 315. Third switch 313 is located between the second terminal of first feedback capacitor 321 and ground. Fourth switch 315 is located between the second terminal of the first feedback capacitor 321 and the output terminal of operational amplifier 300. Fifth switch 317 is located between the second terminal of second feedback capacitor 323 and ground.

Referring now to FIGS. 11 and 12, during a first stage corresponding to ϕ1,1 gain capacitor Cgain accumulates a charge representative of mutual capacitances and stray capacitances in the sense electrode corresponding thereto when the first, second and third switches 309, 311 and 313 are closed, the fourth, fifth and sixth switches 315, 317 and 319 are open, and drive signal Vdr provided to at least one of the drive electrodes is high. The charge accumulated in gain capacitor Cgain during the first stage corresponding to ϕ1,1 is transferred to first feedback capacitor 321 during a second stage corresponding to ϕ2,1 when the second, third, fifth and sixth switches 311, 313, 317 and 319 are open, the first and fourth switches 309 and 315 are closed, and drive signal Vdr is low. First switch 309 is open momentarily between the first and second stages (see FIG. 12). During a third stage corresponding to ϕ1,2, gain capacitor Cgain accumulates a charge representative of mutual capacitances and stray capacitances in the sense electrode corresponding thereto when the first, second and fifth switches 309, 311 and 317 are closed, the third, fourth and sixth switches 313, 315 and 319 are open, and drive signal Vdr provided to at least one of the drive electrodes is high. The charge accumulated in gain capacitor Cgain during the third stage corresponding to ϕ1,2 is transferred to second feedback capacitor 323 during a fourth stage corresponding to ϕ2,2 when the second, third, fourth and fifth switches 311, 313, 315 and 317 are open, the first and sixth switches 309 and 319 are closed, and drive signal Vdr is low. First switch 309 is open momentarily between the third and fourth stages. Note that in various embodiments, appropriately configured transconductance amplifiers and associated circuitry may be substituted for operational amplifiers 300 shown in FIG. 11 (and in FIGS. 6, 7 and 9)

Referring to FIG. 12, operation of the first, second, third, fourth, fifth and sixth switches may be controlled by a processor operably connected to the sense circuit in a manner well know to those skilled in the art. Such a processor may be configured to provide first digital control signals ϕ1,1 to the first, second and third switches 309, 311 and 313 that are in a high logical state over at least portions of time when the drive signal is high and that are in a low logical state when the drive signal is low. Such a processor may also be configured to provide first digital control signals ϕ1,1 to the first, second and third switches 309, 311 and 313 that are in a low logical state near leading and trailing edges of each high drive signal. The processor may further be configured to provide a second digital control signals ϕ1,2 to the first and fourth switches 309 and 315 that are in a high logical state over at least portions of time when the drive signal is low and that are in a low logical state when the drive signal is high. Note that the processor may further be configured to open and close other switches of circuit 307 of FIG. 11 in accordance with the operational principles described above and shown in FIGS. 11 and 12.

Continuing to refer to FIGS. 11 and 12, assume for the sake of simplicity that Vdr during phase ϕ1=Vdr0, and that Vdr during phase φ2=0, and that an expression for an output signal acquired from touchscreen or touch panel 90 over K acquisition cycles may be expressed as follows:

$$V_{o2} = \frac{C_{gain}}{C_f} \frac{C_{emi} \sum_{k=1}^{k=K}(V_{emi\varphi 1,k} - V_{emi\varphi 2,k}) + C_{pix\_i0}V_{dr0}}{\sum_{i=1}^{N}(C_{pix\_i} + C_{self\_i}) + C_{emi} + C_{gain} + C_{con} + C_{pad}} \quad (10)$$

where $V_{emi\varphi 1,k}$ and $V_{emi\varphi 2,k}$ are EMI voltages occurring at the end of an acquisition phase of a Kth cycle acquired over a period T, and are correspondingly controlled by control signals φ1,k and φ2,k. The filtering properties of the acquisition circuit shown in FIG. 11 for acquisition over K cycles with a period T may be derived by assuming EMI has spectrum $V_{emi}(\omega)$ as follows:

$$V_{o2}(\omega) = \frac{C_{gain}}{C_f} \frac{\left(\left[C_{emi}V_{emi}(\omega)e^{-j\omega(\frac{T}{2}-\Delta)}\left(1-e^{-j\omega\frac{T}{2}}\right) + C_{pix\_i0}V_{dr0}e^{-j\omega\Delta}\frac{1-e^{-j\omega(\frac{T}{2}-2\Delta)}}{j\omega}\right]\frac{1-e^{-j\omega KT}}{K(1-e^{-j\omega T})}\right)}{\left(\sum_{i=1}^{N}(C_{pix\_i}+C_{self\_i})+C_{emi}+C_{gain}+C_{con}+C_{pad}\right)} \quad (11)$$

From equation (11) above, the signal-to-noise (or rather signal to EMI) ratio ("SNR") caused by an interfering harmonic sine wave with an oscillation frequency of $\omega_0$ over K periods of acquisition cycles, each cycle having a duration T, may be derived in equation (12) as follows:

$$SNR(\omega_0) = \frac{C_{pix\_i0}V_{dr0}}{C_{emi}V_{emi0}\left|2\left(1-e^{-j\omega_0\frac{T}{2}}\right)\frac{1-e^{-j\omega_0 KT}}{K(1-e^{-j\omega_0 T})}\right|} \quad (12)$$

Equation (12) shows that the SNR in the region of harmonic EMI frequencies may be improved by varying the T and K parameters for the readout circuit acquisition cycle to make the denominator of equation (12) become relatively small.

Figure 13:
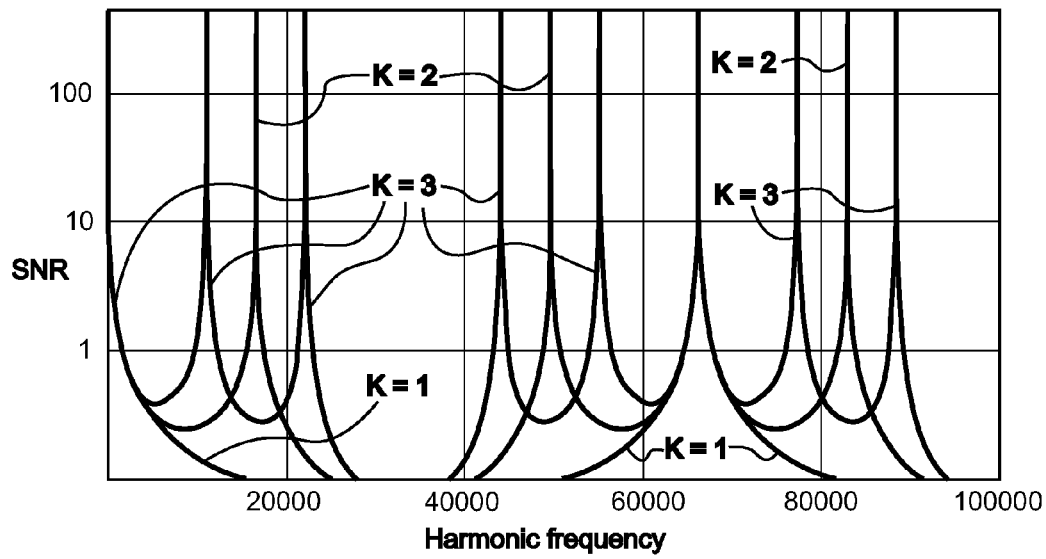
FIGS. 13 and 14 illustrate the effects of harmonic noise on the outputs provided by circuit 307 of FIG. 11.

The impact of harmonic noise on output signals presented by the readout circuit of FIG. 11, where the output sensed signals are "averaged" or filtered over K cycles by connecting K charged capacitors to the integrator output, is shown in FIG. 13 for K=1, 2 and 3. The results shown in FIG. 13 were generated using the following parameters for readout circuit 307 of FIG. 11: a harmonic EMI of $2V_{emi0}$=15 V (pk-pk) was injected into circuit 307 using Cemi=2 pF; a drive signal amplitude of Vrd0=1.8 V was used with a pixel capacitance of Cpix=2.218 pF together with a cycle period of T=30.2 usec and a delay time interval Δ=50 nsec.

Figure 14:
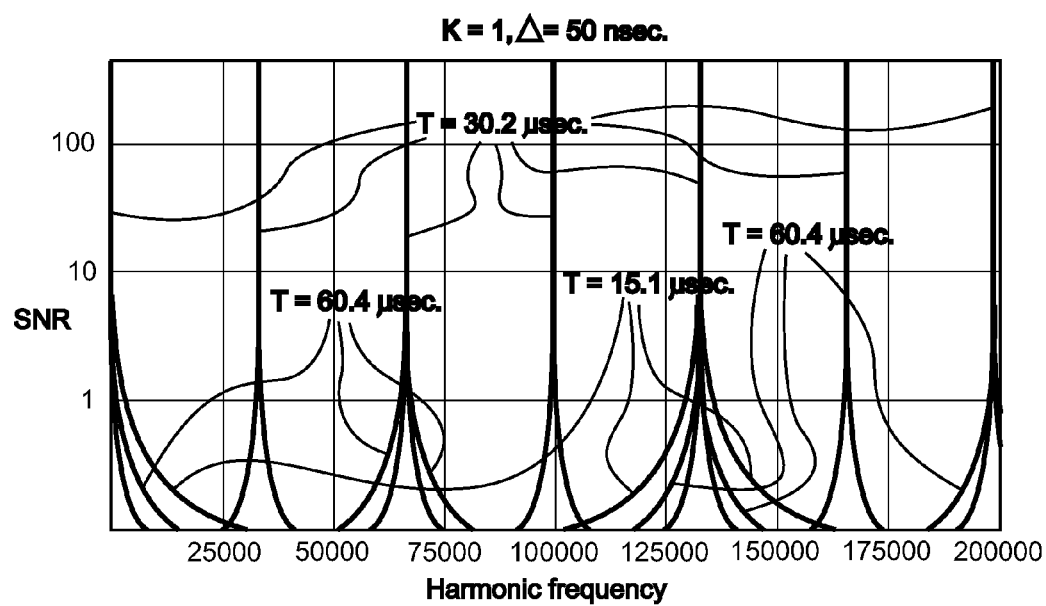
Figure 15:
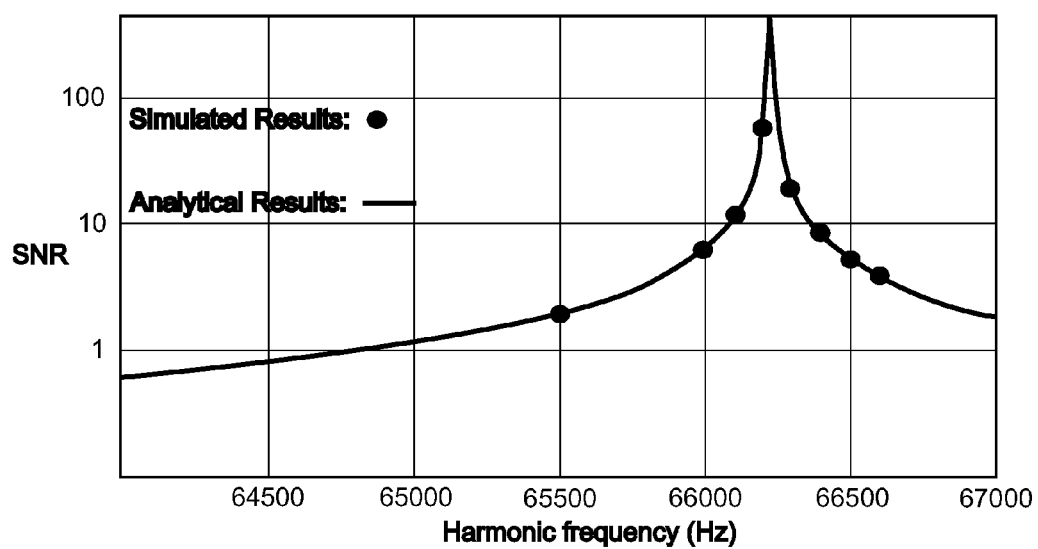
FIG. 15 shows analytical and simulated readout capacitance responses provided by readout circuit 307 of FIG. 11.

FIG. 14 demonstrates SNR sensitivity to the variation of repetition cycle T. Keeping Δ=50 nsec and K=1, a harmonic SNR was simulated for T=0.5×30.2 usec, 30.2 usec, and 2×30.2 usec. The simulated results where T is varied are shown by the plotted lines in FIG. 14 corresponding to T=15.1 usec, 30.2 usec, and 60.4 usec, respectively. The response of circuit 307 of FIG. 11 to the foregoing pixel and EMI parameters was then simulated using Spectre™ software to verify equation (12). As shown in FIG. 14, the peak-to-peak amplitude variation of the signal voltages stored in the integrator feedback capacitors of circuit 307 upon the completion of each acquisition cycle are compared to the output signal peak-to-peak variations without EMI oscillations. FIG. 15 compares the harmonic SNR predicted by Spectre circuit simulation results (solid circles in FIG. 15) to those given by equation (12) (solid line in FIG. 15). As shown in FIG. 15, the simulation and analytical results closely match one another.

In the various embodiments of readout circuits disclosed herein, because no touchscreen or touch panel recharge is required, the amount of time available for signal acquisition doubles relative to prior art touchscreen or touch panel readout circuits. Moreover, the voltage offsets of the integrating amplifiers are compensated for by signals stored in the readout circuit capacitors. In some embodiments, the readout circuits disclosed above permit large dynamic range capacitive touchscreen or touch panel signals to be processed, and do not require panel reset. In some embodiments, such readout circuits also permit doubling of the signal acquisition rate and pre-filtering of acquired touch panel signals for improved immunity from harmonic EMI. Moreover, signal acquisition and temporary storage may be carried out using the same capacitors in such readout circuits. As mentioned above, suitably configured transconductance amplifiers and associated circuitry may be substituted for the operational amplifiers shown in FIGS. 6, 7, 9 and 11.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

I claim:

1. A capacitive touchscreen system, comprising:
   a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes;
   one or more drive circuits operably connected to the first plurality of drive electrodes, and
   a plurality of sense circuits, each of the plurality of sense circuits being operably connected to a corresponding one of the second plurality of sense electrodes, each sense circuit comprising a gain capacitor having first and second terminals, a first switch, a second switch, a third switch, and an operational amplifier having positive and negative input terminals and an output terminal, the first terminal of the gain capacitor being connected to the corresponding sense electrode, the second terminal of the gain capacitor being operably connected to the first and second switches, the positive input terminal being connected to ground, the first switch being located between the second terminal of the gain capacitor and ground, the second switch being located between the second terminals of the gain capacitor and the negative input terminal of the operational amplifier, the third switch being located in a feedback loop of the operational amplifier between the negative input and output terminals thereof, the feedback capacitor being arranged in parallel with respect to the third switch in the feedback loop;

wherein during a first stage the gain capacitor accumulates a charge representative of mutual capacitances and stray capacitances in the sense electrode corresponding thereto when the first switch is closed, the second switch is open, the third switch is closed, and a drive signal provided to at least one of the drive electrodes is high, and the charge accumulated in the gain capacitor during the first stage is transferred to the feedback capacitor during a second stage when the first switch is open, the second switch is closed, the third switch is open, and the drive signal is low.

2. The touchscreen system of claim 1, wherein the operational amplifier is a transconductance amplifier.

3. The touchscreen system of claim 1, wherein operation of the first, second and third switches is controlled by a processor operably connected to the sense circuit.

4. The touchscreen system of claim 3, wherein the processor is configured to provide first digital control signals to the first and third switches that are in a logical high state over at least portions of time when the drive signal is high and that are in a logical low state when the drive signal is low.

5. The touchscreen system of claim 4, wherein the processor is further configured to provide first digital control signals to the first and third switches that are in logical low state near leading and trailing edges of each high drive signal.

6. The touchscreen system of claim 3, wherein the processor is configured to provide a second digital control signal to the second switch that is in a logical high state over at least portions of time when the drive signal is low and that is in a logical low state when the drive signal is high.

7. The touchscreen system of claim 6, wherein the processor is further configured to provide a second digital control signal to the second switch that is in a logical high state after trailing edges of one high drive signal and before leading edges of a following high drive signal.

8. A capacitive touchscreen system, comprising:
a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes;
one or more drive circuits operably connected to the first plurality of drive electrodes, and
a plurality of sense circuits, each of the plurality of sense circuits being operably connected to a corresponding one of the second plurality of sense electrodes, each sense circuit comprising a gain capacitor having first and second terminals, a first switch, a second switch, a third switch, a fourth, and an operational amplifier having positive and negative input terminals and an output terminal, the first terminal of the gain capacitor being connected to the corresponding sense electrode, the second terminal of the gain capacitor being operably connected to the first switch, the positive input terminal being connected to ground, the first switch being located between the gain capacitor and the negative input terminal of the operational amplifier, the second switch being located in a first feedback loop of the operational amplifier between the negative input and output terminals thereof, a feedback capacitor having a first terminal connected to the negative input of the amplifier and a first terminal of the second switch, a second terminal of the feedback capacitor being connected to the third switch and the fourth switch, the third switch being located between the second terminal of the feedback capacitor and ground, the fourth switch being located between the second terminal of the feedback capacitor and the output terminal of the operational amplifier;

wherein during a first stage the gain capacitor accumulates a charge representative of mutual capacitances and stray capacitances in the sense electrode corresponding thereto when the first, second and third switches are closed, the fourth switch is open, and a drive signal provided to at least one of the drive electrodes is high, and the charge accumulated in the gain capacitor during the first stage is transferred to the feedback capacitor during a second stage when the second and third switches are open, the first and fourth switches are closed, and the drive signal is low, the first switch being open momentarily between the first and second stages.

9. The touchscreen system of claim 8, wherein the operational amplifier is a transconductance amplifier.

10. The touchscreen system of claim 8, wherein operation of the first, second, third, and fourth switches is controlled by a processor operably connected to the sense circuit.

11. The touchscreen system of claim 10, wherein the processor is configured to provide first digital control signals to the first, second and third switches that are in a high logical state over at least portions of time when the drive signal is high and that are in a low logical state when the drive signal is low.

12. The touchscreen system of claim 11, wherein the processor is further configured to provide first digital control signals to the first, second and third switches that are in a low logical state near leading and trailing edges of each high drive signal.

13. The touchscreen system of claim 10, wherein the processor is configured to provide a second digital control signal to the fourth switch that is in a high logical state over at least portions of time when the drive signal is low and that is in a low logical state when the drive signal is high.

14. The touchscreen system of claim 13, wherein the processor is further configured to provide the second digital control signal to the fourth switch that is in a high logical state after trailing edges of one high drive signal and before leading edges of a following high drive signal.

15. A capacitive touchscreen system, comprising:
a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, stray capacitances being associated with each of the second plurality of electrodes;

one or more drive circuits operably connected to the first plurality of drive electrodes, and a plurality of sense circuits, each of the plurality of sense circuits being operably connected to a corresponding one of the second plurality of sense electrodes, each sense circuit comprising a gain capacitor having first and second terminals, first, second, third, fourth, fifth and sixth switches, an operational amplifier having positive and negative input terminals and an output terminal, and first and second feedback capacitors, the first terminal of the gain capacitor being connected to the corresponding sense electrode, the second terminal of the gain capacitor being operably connected to the first switch, the positive input terminal being connected to ground, the first switch being located between the gain capacitor and the negative input terminal of the operational amplifier, the second switch being located in a feedback loop of the operational amplifier between the negative input and output terminals thereof, the first feedback capacitor having a first terminal connected to the negative input of the amplifier and a first terminal of the second feedback capacitor, the sixth switch being connected between a second terminal of the second feedback capacitor and the output of the operational amplifier, a second terminal of the first feedback capacitor being connected to the third and fourth switches, the third switch being located between the second terminal of the first feedback capacitor and ground, the fourth switch being located between the second terminal of the first feedback capacitor and the output terminal of the operational amplifier, the fifth switch being located between the second terminal of the second feedback capacitor and ground;

wherein during a first stage the gain capacitor accumulates a charge representative of mutual capacitances and stray capacitances in the sense electrode corresponding thereto when the first, second and third switches are closed, the fourth, fifth and sixth switches are open, and a drive signal provided to at least one of the drive electrodes is high, and the charge accumulated in the gain capacitor during the first stage is transferred to the first feedback capacitor during a second stage when the second, third, fifth and sixth switches are open, the first and fourth switches are closed, and the drive signal is low, the first switch being open momentarily between the first and second stages, during a third stage the gain capacitor accumulates a charge representative of mutual capacitances and stray capacitances in the sense electrode corresponding thereto when the first, second and fifth switches are closed, the third, fourth and sixth switches are open, and a drive signal provided to at least one of the drive electrodes is high, and the charge accumulated in the gain capacitor during the third stage is transferred to the second feedback capacitor during a fourth stage when the second, third, fourth and fifth switches are open, the first and sixth switches are closed, and the drive signal is low, the first switch being open momentarily between the third and fourth stages.

16. The touchscreen system of claim 15, wherein the operational amplifier is a transconductance amplifier.

17. The touchscreen system of claim 15, wherein operation of the first, second, third, fourth, fifth and sixth switches is controlled by a processor operably connected to the sense circuit.

18. The touchscreen system of claim 17, wherein the processor is configured to provide first digital control signals to the first, second and third switches that are in a high logical state over at least portions of time when the drive signal is high and that are in a low logical state when the drive signal is low.

19. The touchscreen system of claim 18, wherein the processor is further configured to provide first digital control signals to the first, second and third switches that are in a low logical state after trailing edges of one high drive signal and before leading edges of a following high drive signal.

20. The touchscreen system of claim 17, wherein the processor is configured to provide a second digital control signal to the fifth switch that is in a high logical state over at least portions of time when the drive signal is low and that is in a low logical state when the drive signal is high.

21. The touchscreen system of claim 20, wherein the processor is further configured to provide the second digital control signal to the fourth switch that is in a high logical state after trailing edges of one high drive signal and before leading edges of a following high drive signal.

22. The touchscreen system of claim 21, wherein the processor is configured to provide third digital control signals to the first, second and fifth switches that are in a high logical state over at least portions of time when the drive signal is low and that are in a low logical state when the drive signal is high.

23. The touchscreen system of claim 22, wherein the processor is configured to provide fourth digital control signals to the first and sixth switches that are in a high logical state over at least portions of time when the drive signal is low and that are in a low logical state when the drive signal is high.

* * * * *